(12) United States Patent
Keohane et al.

(10) Patent No.: US 9,576,277 B2
(45) Date of Patent: *Feb. 21, 2017

(54) AUTOMATED ELECTRONIC MESSAGE FILING SYSTEM

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,637

(22) Filed: Jul. 19, 2012

(65) Prior Publication Data

US 2012/0284273 A1 Nov. 8, 2012

Related U.S. Application Data

(63) Continuation of application No. 10/777,646, filed on Feb. 12, 2004, now Pat. No. 8,266,218.

(51) Int. Cl.
  *G06F 15/177* (2006.01)
  *G06Q 10/10* (2012.01)
(52) U.S. Cl.
  CPC .................. *G06Q 10/107* (2013.01)
(58) Field of Classification Search
  CPC .............. G06Q 10/107; H04L 29/1215; H04L 29/12594; H04L 61/1564; H04L 61/302; H04L 63/0428; H04L 12/5875; H04L 51/30; H04L 51/34; H04L 63/166; H04L 9/0861; H04L 9/0894; H04L 9/14; H04L 9/3236;

(Continued)

(56) References Cited

U.S. PATENT DOCUMENTS 5,377,354 A 12/1994 Scannell et al.
6,226,630 B1 5/2001 Billmers (Continued)

OTHER PUBLICATIONS

U.S. Appl. No. 13/552,636, filed Jul. 19, 2012, In re Keohane, International Business Machines Corporation, 33 pages.

(Continued)

*Primary Examiner* — Ryan Jakovac
(74) *Attorney, Agent, or Firm* — Amy J. Pattillo; Joseph Petrokaitis

(57) ABSTRACT

A receipt receives an electronic message from a sender, wherein said electronic message comprises at least one suggested folder name specified by the sender for the recipient to select as a folder name for filing the electronic message, wherein the at least one suggested folder name is detected by a sender computer system from a selection by the sender within a user interface of the sender computer system of the at least one suggested folder name for the electronic message and inserted into the electronic message. The electronic message is filtered to detect the at least one suggested folder name for filing the electronic message in a messaging filing directory. Responsive to the recipient selecting to file the electronic message, the electronic message is filed in at least one folder with the suggested folder name from among a plurality of folders.

15 Claims, 6 Drawing Sheets

(58) Field of Classification Search
CPC . H04L 9/3265; G06F 21/606; G06F 21/6209; G06F 21/64; G06F 17/3061; G06F 2221/2107
See application file for complete search history.

(56) References Cited

U.S. PATENT DOCUMENTS

| | | | |
|---|---|---|---|
| 6,396,513 B1 | 5/2002 | Helfman et al. | |
| 6,546,417 B1 | 4/2003 | Baker | |
| 6,560,632 B1 | 5/2003 | Chess et al. | |
| 6,587,549 B1 | 7/2003 | Weik | |
| 6,609,138 B1 | 8/2003 | Merriam | |
| 6,725,228 B1 | 4/2004 | Clark et al. | |
| 7,219,302 B1 * | 5/2007 | O'Shaughnessy et al. | 715/752 |
| 2002/0120696 A1 | 8/2002 | Mousseau et al. | |
| 2002/0133557 A1 | 9/2002 | Winarski | |
| 2003/0033271 A1 | 2/2003 | Hendricks | |
| 2003/0065728 A1 | 4/2003 | Milovanovic | |
| 2005/0198153 A1 | 9/2005 | Keohane et al. | |
| 2005/0235034 A1 | 10/2005 | Chen et al. | |
| 2006/0026236 A1 | 2/2006 | Scian et al. | |
| 2006/0080278 A1 | 4/2006 | Neiditsch et al. | |
| 2006/0168012 A1 | 7/2006 | Rose et al. | |
| 2006/0173842 A1 | 8/2006 | Horvitz et al. | |
| 2006/0277195 A1 | 12/2006 | Schulz et al. | |
| 2006/0277205 A1 * | 12/2006 | Song et al. | 707/102 |
| 2007/0061400 A1 | 3/2007 | Parsons | |
| 2007/0067399 A1 | 3/2007 | Kulkami et al. | |
| 2012/0284272 A1 | 11/2012 | Keohane et al. | |

OTHER PUBLICATIONS

Office Action, U.S. Appl. No. 10/777,646, filed Feb. 12, 2004, In Re Keohane, International Business Machines Corporation, mailing date Sep. 18, 2007, 31 pages.

Gleicher, Michael, Integrating Constraints and Direct Manipulation, Proceedings, 1992 Symposium on Interactive 3d Graphics, pp. 171-174.

Final Office Action, U.S. Appl. No. 10/777,646, filed Feb. 12, 2004, In re Keohane, International Business Machines Corporation, mailing date Mar. 18, 2008, 21 pages.

Microsoft, Windows XP Automatically Expanding a Display Directory, 2001.

Examiner Answer, U.S. Appl. No. 10/777,646, filed Feb. 12, 2004, In re Keohane, International Business Machines Corporation, mailing date Mar. 24, 2009, 14 pages.

Appeal Board Decision, U.S. Appl. No. 10/777,646, filed Feb. 12, 2004, In re Keohane, International Business Machines Corporation, mailing date Feb. 15, 2012, 11 pages.

Notice of Allowance, U.S. Appl. No. 10/777,646, filed Feb. 12, 2004, In re Keohane, International Business Machines Corporation, mailing date May 4, 2012, 17 pages.

Office Action, U.S. Appl. No. 13/552,637, filed Jul. 19, 2012, In Re Keohane, mailing date Feb. 13, 2013, 27 pages.

Final Office Action, U.S. Appl. No. 13/552,636, filed Jul. 19, 2012, In Re Keohane, mailing date May 28, 2013, 15 pages.

Notice of Allowance, U.S. Appl. No. 13/552,636, filed Jul. 19, 2012, In Re Keohane, mailing date Jul. 27, 2016, 20 pages.

Non-final Office Action, U.S. Appl. No. 13/552,636, filed Jul. 19, 2012, In Re Keohane, mailing date Feb. 8, 2013, 27 pages.

* cited by examiner

AUTOMATED ELECTRONIC MESSAGE FILING SYSTEM

CROSS-REFERENCE TO RELATED APPLICATIONS

This application is a continuation of commonly assigned U.S. patent application Ser. No. 10/777,646, filed Feb. 12, 2004, which is hereby incorporated herein by reference.

BACKGROUND OF THE INVENTION

1. Technical Field

The present invention relates in general to improved messaging systems and in particular to improved filing of electronic messages within messaging systems. Still more particularly, the present invention relates to filtering the folders in a filing system to present the user with a suggested selection of folders for filing a particular electronic message.

2. Description of the Related Art

The use of electronic mail (e-mail) and other electronic messaging and communications, such as instant messaging, has expanded rapidly over the last few years. Typically, an e-mail application, such as Lotus Notes, provides a user interface between the user and an e-mail server that sends and receives e-mail via a network, such as the Internet.

E-mails, like other data files, often need to be categorized and filed for later retrieval. Thus, many e-mail applications will include a directory structure of files for storing e-mails. Users are typically enabled to add and name folders within the directory structure and then move e-mails into the different folders.

A disadvantage of current e-mail filing systems is that as the number of folders in a directory structure increases, more and more time is required for a user to locate a particular folder and select to place an e-mail in that folder. Further, a disadvantage of current e-mail filing systems is that a user must take time to determine which folder to place an e-mail in. A user may have multiple folders that an email could potentially be placed in or may need to create a new folder to store the e-mail. Either way, eventually, filing the e-mail away in a folder may become so time consuming that any benefit of later locating the e-mail by its folder location is diminished.

In addition to e-mail, other types of electronic messaging can be saved and filed. For example, a participant in an instant messaging session may save and file the session. However, just as e-mail filing systems are currently limited, so are filing systems for other types of electronic messaging where locating the appropriate filing folder can be time consuming.

Therefore, in view of the foregoing, there is a need for a method, system, and program for automating the folder creation and filing process for e-mail and other electronic messages. In particular, there is a need for a method, system, and program for automatic location and presentation of suggested folders for filing a particular electronic message. Further, there is a need for a method, system, and program for automatic creation of a folder and filing an electronic message in the newly created folder based on a folder name suggestion by the sender of the electronic message.

SUMMARY OF THE INVENTION

Therefore, the present invention provides a messaging systems and in particular to provides a method, system, and computer program product for filing electronic messages within messaging systems. The present invention provides a method, system, and computer program product for filtering the folders in a filing system to present the user with a suggested selection of folders for filing a particular electronic message. The present invention provides a method, system, and computer program product for enabling a sender to suggest a filing folder name to be used by the recipient of an electronic message for filing for the electronic message.

According to one embodiment of the invention, a method for filing electronic messages is directed to receiving, at a recipient computer system, an electronic message for a recipient from a sender, wherein said electronic message comprises at least one suggested folder name specified by the sender for the recipient to select as a folder name for filing the electronic message, wherein the at least one suggested folder name is detected by a sender computer system from a selection by the sender within a user interface of the sender computer system of the at least one suggested folder name for the electronic message and inserted into the electronic message. The method is directed to filtering, by the recipient computer system, the electronic message to detect the at least one suggested folder name for filing the electronic message in a messaging filing directory. The method is directed, responsive to detecting an icon for the particular electronic message dragged into a display region for a plurality of folders, to automatically positioning the icon over at least one folder with the suggested folder name from among the plurality of folders. The method is directed, responsive to detecting the icon released over at least one suggested folder from among the at least one folder, to detecting the recipient selecting to file the electronic message in the at least one suggested folder. The method is directed, responsive to the recipient selecting to file the electronic message, filing the electronic message in the at least one suggested folder with the at least one suggested folder name from among the plurality of folders.

According to another embodiment of the invention, a system for filing electronic messages comprises a messaging controller, at a recipient computer system, operative to receive an electronic message for a recipient from a sender, wherein said electronic message comprises at least one suggested folder name specified by the sender for the recipient to select as a folder name for filing the electronic message, wherein the at least one suggested folder name is detected by a sender computer system from a selection by the sender within a user interface of the sender computer system of the at least one suggested folder name for the electronic message and inserted into the electronic message. The system comprises the message controller operative to filter the electronic message to detect the at least one suggested folder name for filing the electronic message in a messaging filing directory. The system comprises the message controller, responsive to detecting an icon for the particular electronic message dragged into a display region for a plurality of folders, operative to automatically positioning the icon over at least one folder with the suggested folder name from among the plurality of folders. The system comprises the message controller, responsive to detecting the icon released over at least one suggested folder from among the at least one folder, operative to detect the recipient selecting to file the electronic message in the at least one suggested folder. The system comprises the message controller, responsive to the recipient selecting to file the electronic message, operative to file the electronic message in the at least one suggested folder with the at least one suggested folder name from among the plurality of folders.

According to another embodiment of the invention, a computer program product for filing electronic messages comprises one or more computer-readable tangible storage devices. The computer program product comprises program instructions, stored on at least one of said one or more storage devices, to, at a recipient computer system, receive an electronic message for a recipient from a sender, wherein said electronic message comprises at least one suggested folder name specified by the sender for the recipient to select as a folder name for filing the electronic message, wherein the at least one suggested folder name is detected by a sender computer system from a selection by the sender within a user interface of the sender computer system of the at least one suggested folder name for the electronic message and inserted into the electronic message. The computer program product comprises program instructions, stored on at least one of said one or more storage devices, to filter the electronic message to detect the at least one suggested folder name for filing the electronic message in a messaging filing directory. The computer program product comprises program instructions, stored on at least one of said one or more storage devices, responsive to detecting an icon for the particular electronic message dragged into a display region for a plurality of folders, to automatically positioning the icon over at least one folder with the suggested folder name from among the plurality of folders. The computer program product comprises program instructions, stored on at least one of said one or more storage devices, responsive to detecting the icon released over at least one suggested folder from among the at least one folder, to detect the recipient selecting to file the electronic message in the at least one suggested folder.

The computer program product comprises program instructions, stored on at least one of said one or more storage devices, responsive to the recipient selecting to file the electronic message, to file the electronic message in the at least one suggested folder with the at least one suggested folder name from among the plurality of folders.

A suggested folder is determined by first detecting a suggested folder name specified by a sender of the electronic message. The suggested folder is the folder with the same name as the suggested folder name.

A suggested folder is graphically distinguished or listed in a separate list. Further, a target folder and secondary folder is determined and graphically distinguished from one another.

If the display region showing the messaging directory is not able to show the entire directory, then those folders displayed within the display region are adjusted to show one or more suggested folders. A messaging directory with multiple levels of folders is expanded to display one or more suggested folders.

One method of selecting to file an electronic message is by dragging the message entry into the display area of the message directory and dropping an icon for the electronic message over a particular folder. When a drag icon is detected within the display area of the message directory, the drag icon is automatically repositioned over the closest suggested folder. The drag icon is further repositioned from suggested folder to suggested folder and the portion of the directory displayed is automatically adjusted as the user selects to move the drag icon to a next suggested folder.

According to another embodiment of the invention, an electronic message is created by a sender. A suggested filing folder name is attached to the electronic message and the electronic message is sent with the suggested filing folder name to a recipient. By attaching a suggested filing folder name to the electronic message when the electronic message is sent, a receipt messaging system automatically files the electronic message in a folder with the suggested folder name when the recipient receives the electronic message. A sender specifies the suggested filing folder name. If a sender forwards a message or replies to a message filed in a folder by the sender, then folder name in which the forwarded message or replied to message is stored is attached as the suggested filing folder name.

According to another embodiment of the invention, an electronic message is received with a suggested filing folder name. The electronic message is automatically filed in a folder with the suggested filing folder name within a message filing directory, such that filing of the electronic message is efficiently controlled. If there is not a filing folder in the message filing directory with the suggested filing folder name, then one is created. Further, the folder with the suggested filing folder name is preferably graphically distinguished.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
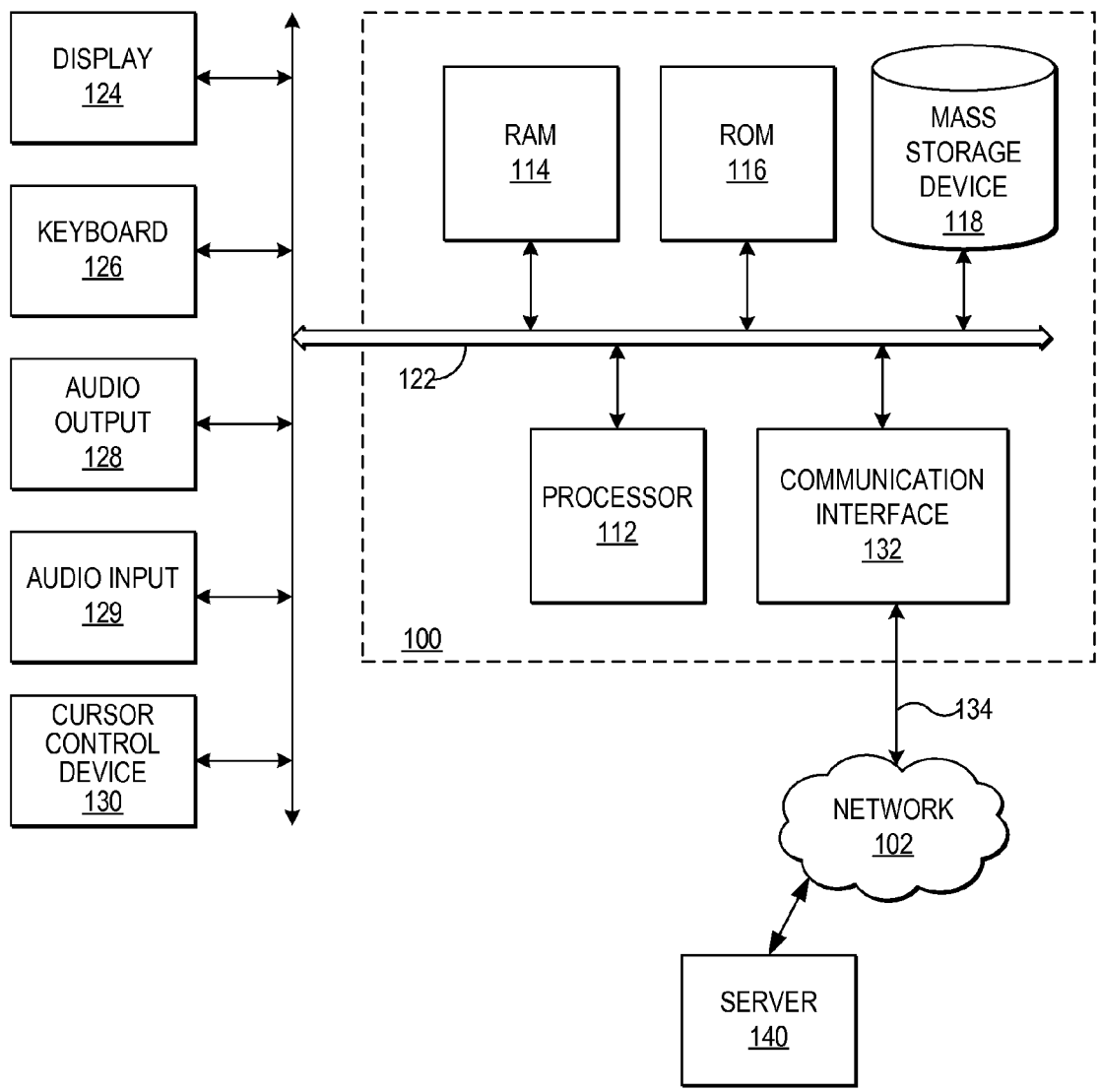
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application software contains machine executable instructions that when executed on processor 112 carry out the operations depicted in the flowcharts of FIGS. 9, 10, 11, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein refers to any data storage medium that participates in providing instructions to processor 112 or other components of computer system 100 for execution. Such a data storage medium may take many forms including, but not limited to, non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other data storage medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114.

Moreover, the present invention may be downloaded as a computer program product, wherein the program instructions may be transferred from a remote computer such as a server 140 to requesting computer system 100 via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
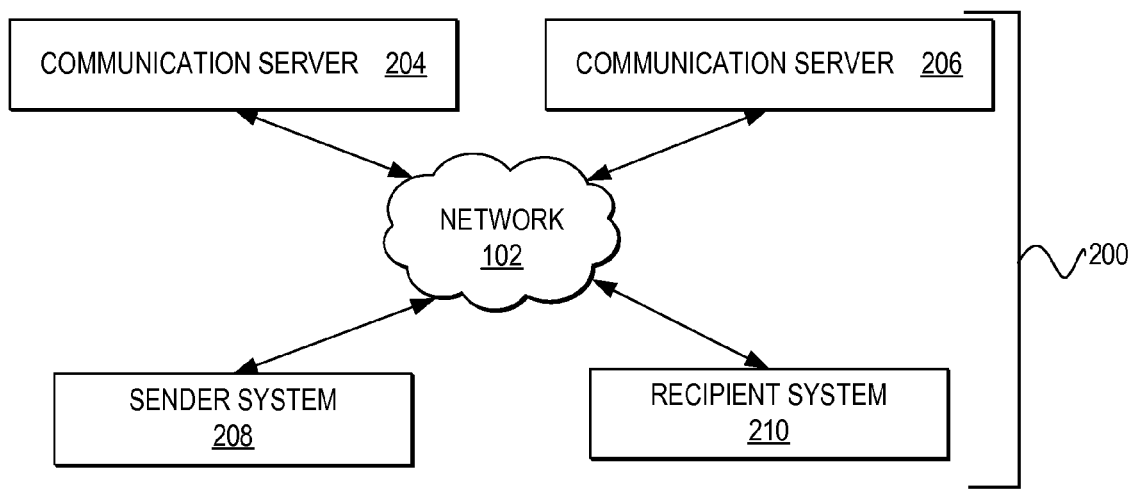
FIG. 2 is a block diagram depicting a distributed network system for facilitating distribution of electronic messages between a sender and a recipient for facilitating one embodiment of the present invention.

With reference now to FIG. 2, a block diagram depicts a distributed network system for facilitating distribution of electronic messages between a sender and a recipient for facilitating one embodiment of the present invention. Distributed data processing system 200 is a network of computers in one embodiment of the invention may be implemented. It will be understood that the present invention may be implemented in other embodiments of systems enabled to communicate via a connection.

In the embodiment, distributed data processing system 200 contains network 102, which is the medium used to provide communications links between various devices and computers connected together within distributed data processing system 200. Network 102 may include permanent connections such as wire or fiber optics cables, temporary connections made through telephone connections and wireless transmission connections.

In the depicted example, communication servers 204 and 206 are connected to network 102. In addition, client systems, herein termed as sender system 208 and recipient system 210, are connected to network 102 and provide a user interface through input/output (I/O) devices. Communication servers 204 and 206 may facilitate electronic messaging systems through which sender system 208 and recipient system 210 communicate through messaging applications, such as a mail reader, located on sender system 208 and recipient system 210. Messaging applications residing on sender system 208 and recipient system 210 provide an interface for implementing messaging services on sender system 208 and recipient system 210. Further, distributed data processing system 200 may include additional servers, clients, and other devices not shown. For example, electronic messages may be sent and received between communication server 204 and other servers (not shown) to distribute and receive messages from other clients (not shown).

The client/server environment of distributed data processing system 200 is implemented within many network architectures. In one example, distributed data processing system 100 is the Internet with network 102 representing a worldwide collection of networks and gateways that use the TCP/IP suite of protocols to communicate with one another. The Internet is enabled by millions of high-speed data communication lines between major nodes or host computers. In another example, distributed data processing system 200 is implemented as an intranet, a local area network (LAN), or a wide area network (WAN). Moreover, distributed data processing system 200 may be implemented in networks employing alternatives to a traditional client/server environment, such as a grid computing environment.

Within distributed data processing system 200, each of client systems 208 and 210 and communication servers 204 and 206 may function as both a "client" and a "server" and may be implemented utilizing a computer system such as computer system 100 of FIG. 1. Further, while the present invention is described with emphasis upon communication servers 204 and 206 facilitating the transfer of electronic messages, the present invention may also be performed by clients 208 and 210 engaged in peer-to-peer network communications and downloading via network 102.

Electronic messages sent and received between sender system 208 and recipient system 210 may be filed in folders or other database systems for organizing and filing documents for easy search and retrieval. A selection of current folders in a folder directory may be automatically selected and suggested for a particular electronic message based on criteria such as the sender name, the recipient name, the date, the subject, and keywords within the communication.

As an advantage of the present invention, the suggested folders are graphically distinguished form non-suggested folders. In addition, according to an advantage of the invention, suggested folders may be prioritized and graphically distinguished to indicate priority.

When a sender or recipient selects to file an electronic message, the folders directory is preferably automatically opened to the locations of the suggested folders, or to a selection of the suggested folders according to the priority of the suggested folders. Alternatively, when a sender or recipient selects to drag and drop an electronic message icon into the folders directory for filing, the electronic message icon is preferably automatically attracted to the closest of the suggested folders or the highest priority of the suggested folders and as the user moves the electronic message icon within the folders directory, the directory may automatically scroll to display other suggested folders.

As an advantage of the present invention, a suggested folder name for the folder to file an electronic message within may be attached to an electronic message before it is sent from sender system 208 via one or both of communication servers 206, to recipient system 210. Further, as an advantage of the present invention, when recipient system 210 receives electronic messages with suggested folder names, the recipient system preferably automatically either offers to file or files the electronic message in a folder with the suggested folder name. If a folder with the suggested folder name is not currently part of the recipient folder directory, then a new folder with the suggested name is opened. It is important to note that the suggested folder name may include a specific textual name or names, but may also indicate a type of folder, a size of folder, a location of the folder, and other folder characteristics.

For purposes of the present invention, electronic messages may include, but are not limited to, e-mail messages, instant messaging, chat sessions, and other forms of text, graphics, audio, and video communications between systems, facilitated by a network. Although the present embodiment is described with emphasis upon an e-mail as the electronic message, it will be understood that the present invention applies to electronic message filing systems for multiple types of electronic messages.

Figure 3:
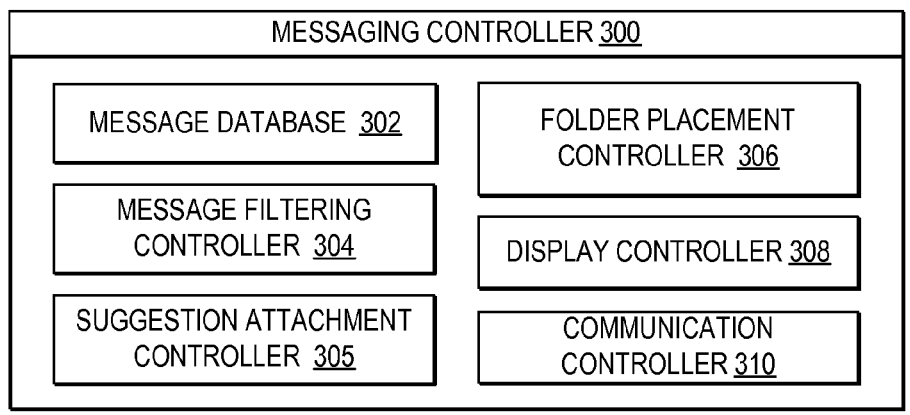
FIG. 3 is a block diagram depicting a messaging controller for controlling an electronic messaging client system in accordance with the method, system, and program of the present invention.

Referring now to FIG. 3, there is depicted a block diagram of a messaging controller for controlling a messaging client system in accordance with the method, system, and program of the present invention. As depicted, a messaging controller 300 includes a message database 302 in which electronic messages are stored. Multiple database structures may be implemented for storage of electronic messages. Preferably, each electronic message may be filed in a particular folder. Folders may be organized in multiple structures, such as a tree or other hierarchical arrangement. Further, folders may be first sectionalized into folders for sent messages and folders for received messages.

A message filtering controller 304 filters electronic messages and determines a selection of suggested folders for filing each electronic message. Specifically, message filtering controller 304 may determine a target folder and other secondary folders in the selection of suggested folders. Further, a received electronic message may include a suggested folder name for the folder for filing the electronic message. In particular, message filtering controller 304 may filter copies of sent messages and received messages to determine a selection of suggested folders for filing each electronic message.

A folder placement controller 306 preferably determines which folders to display within a folder directory window. Additionally, folder placement controller 306 preferably monitors whether a user selects to drag and drop file an electronic message, and if so, attracts the drag icon for the electronic message towards suggested folders. Further, folder placement controller 306 preferably monitors whether the user selects an option to file an electronic message, and if so, opens a directory window with the folder directory automatically opened to the suggested folder(s).

A display controller 308 preferably adjusts the graphical display to indicate the suggested folders determined by message filtering controller 304 for a particular electronic message when a user selects to view that particular electronic message. Folders may be displayed in a directory window alongside other windows of the messaging system user interface. Alternatively, folders may only be displayed in a directory window when a user selects to file an electronic message. Further, display controller 308 preferably adjusts the graphical display according to the directory display decisions of folder placement controller 306.

In addition, display controller 308 may distinguish those folders which are suggested folders in multiple formats. For example, the type setting, coloring, shading, transparency, or other graphical characteristic of a folder name or icon may be adjusted for those folders which are suggested folders. It will be understood that in addition to graphically distinguishing suggested folders from the other folders in the folder directory, text, audio, or video may be used to distinguish the suggested folders.

A communication controller 310 controls the sending and receiving of electronic messages. In particular, the communication controller 310 may initiate a connection to a network to access messaging services. Further, communication controller 310 may initiate a connection directly with another computing system for peer-to-peer network communication.

A suggestion attachment controller 305 controls the attachment of a suggested folder name to an electronic message. In particular, a sender of a message may designate the suggested folder name. Alternatively, a sender may create an electronic message by forwarding or replying to another electronic message that is filed by the sender. Suggestion attachment controller 305 may automatically designate the suggested folder name from the name of the folder in which the forwarded or replied to message is located.

Figure 4:
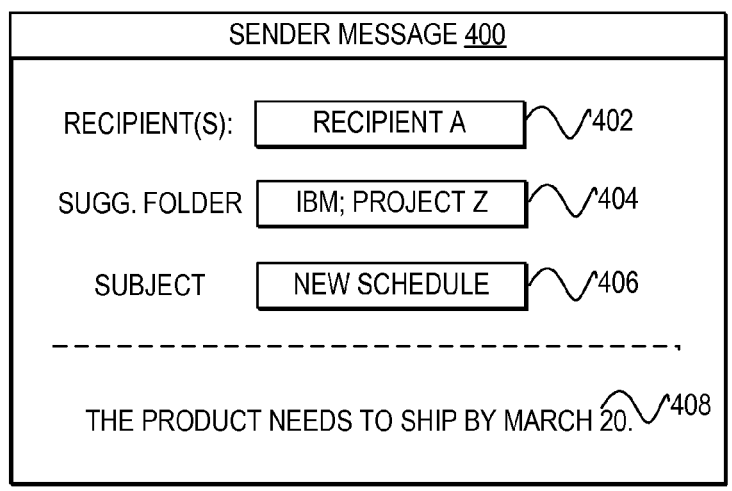
FIG. 4 is an illustrative representation of a sender message with a suggested folder name in accordance with the method, system, and program of the present invention.

With reference now to FIG. 4, a block diagram illustrates a sender message with a suggested folder name in accordance with the method, system, and program of the present invention. As depicted, a sender message 400 includes multiple types of data.

First, in the example, a recipient is designated at reference numeral 402. In the example, the designated recipient is "recipient A". Although not illustrated, the designated recipients may include addresses designated under a "to:" column, a "cc:" column, or a "bcc" column, for example. Further, the type of addressing used to designate a recipient of an electronic message may vary according to the type of addressing implemented in a messaging system.

In addition, in the example, a suggested folder name is designated at reference numeral 404. The suggested folder name in the example is "IBM™; Project Z" where the ";" indicates a sublevel. In alternate examples, a folder name may be designated in an alternate manner. Further, in alternate examples, multiple suggested folder names may be included. Additionally, a suggested folder name may be specified for each recipient of the sender message. Moreover, it will be understood that filing systems may implement filing structures other than folders, wherein the suggested folder name is converted into the type of filing structure implemented by the message filing system.

In the example, a subject is designated at reference numeral 406 and the text of the electronic message is designated at reference numeral 408. It will be understood that other types of information may be included in the electronic message.

Figure 5:
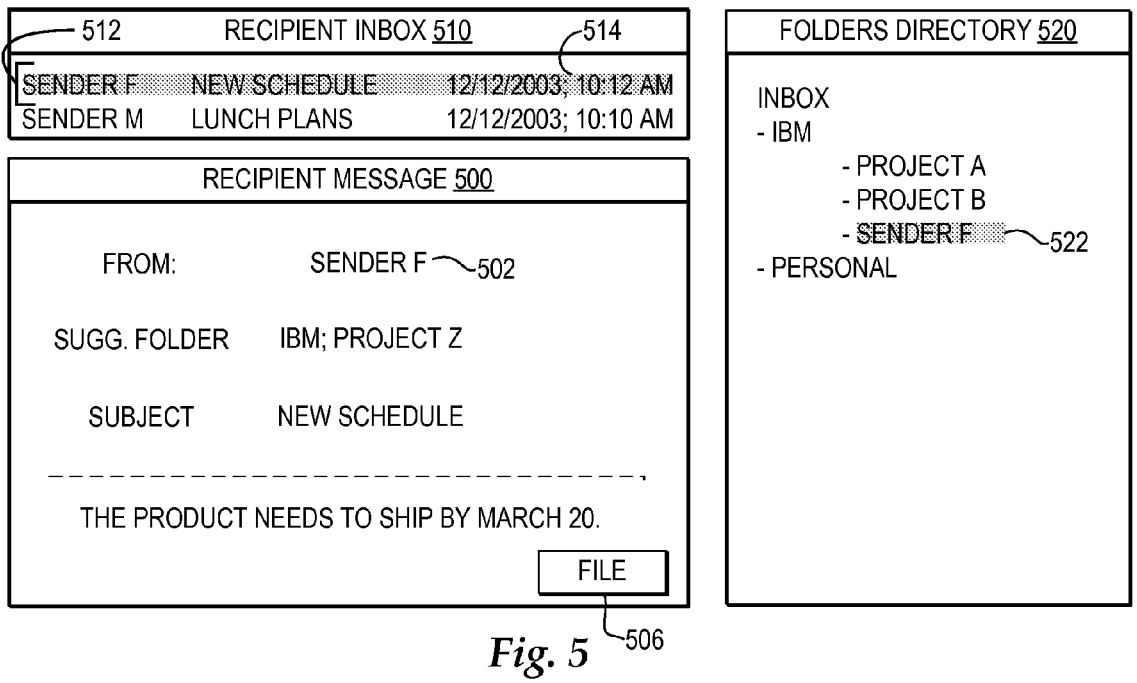
FIG. 5 is an illustrative representation of a recipient messaging interface displaying an electronic message received with a suggested folder name in accordance with the method, system, and program of the present invention.

Referring now to FIG. 5, a block diagram illustrates a recipient messaging interface displaying a electronic message received with a suggested folder name in accordance with the method, system, and program of the present invention. In the interface, a recipient inbox 510 is a window depicting the newly received e-mail messages for the recipient. In the example, the e-mail message designated by reference numeral 512 and received from "sender F" is selected. Recipient message window 500 displays e-mail messages selected from recipient inbox 510. In the example, sender message 400, as illustrated in FIG. 4, is selected and displayed in recipient message window 500.

According to one embodiment of the present invention, a recipient may select an option to file an e-mail message. In the example, the recipient may select option by selecting a file button 506. In alternate embodiments, other types of options may be provided to the recipient for selecting to file an e-mail message.

According to an advantage of the present invention, when an e-mail message is received in recipient inbox 510, a target folder and secondary folders suggested for filing the e-mail message are determined. Multiple methods may be used to determine target and secondary folder suggestions. As an advantage of the present invention, a sender of the e-mail message may include a suggested folder name for a folder, which is advantageously selected as the target folder. Other methods of determining target and secondary folder suggestions include scanning the message for keywords, scanning the message for sender names and other recipient names, and scanning the message for an indicator of the importance of the message. From the scanned information, target and secondary folder suggestions may be made from the named folders in a folder directory.

Then, according to another advantage of the present invention, when a recipient selects to read or open the e-mail message located in recipient inbox 510, a folder directory window 520 displays the recipient folder directory with the target and secondary folder suggestions highlighted or otherwise graphically distinguishable. Alternatively, the target and secondary folder suggestions may be indicated through other types of output, such as an audio indicator of the target and secondary folder suggestions.

In the example of folders directory 520, a multi-tiered folder structure is implemented. In the example, the only suggested folder is the folder located first under the "IBM" folder and specifically under a sub-level folder titled "sender F" as indicated by the highlighting designated at reference numeral 522. In the example, the folder "IBM" is automatically expanded to reveal the target folder suggestion. In alternate embodiments where the directory size exceeds the size of folders directory window 520, then the portions of the directory which include target and secondary folder suggestions may be expanded and displayed within the directory window region.

Figure 6:
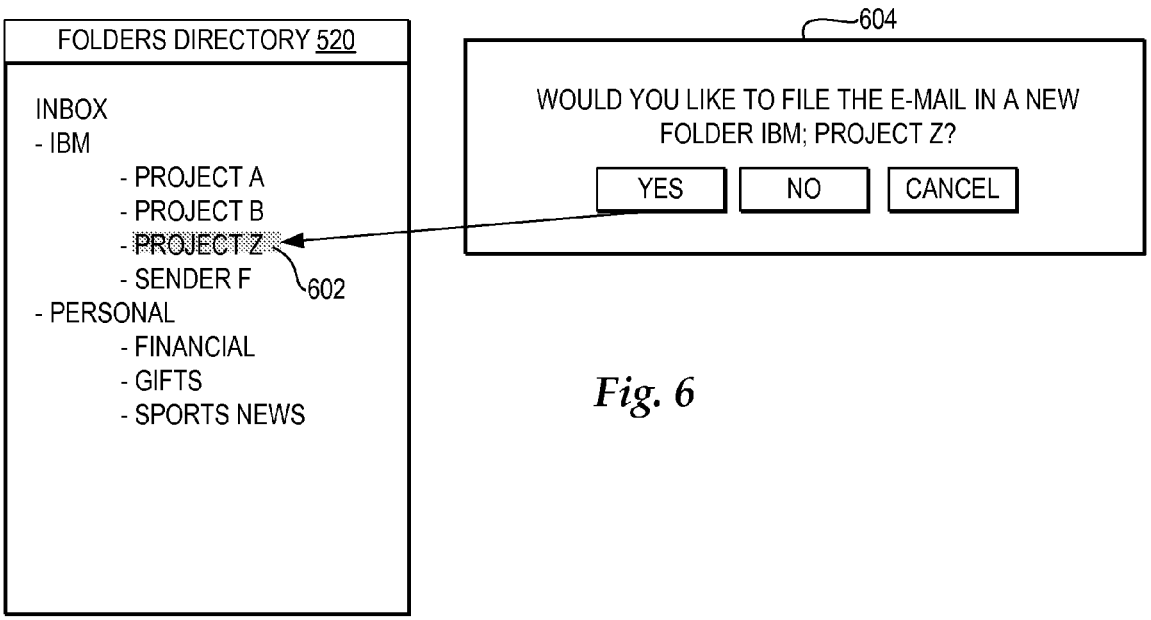
FIG. 6 is an illustrative representation of a folders directory with a new folder based on the suggested folder name by a sender of an electronic message in accordance with the method, system, and program of the present invention.

With reference now to FIG. 6, a block diagram depicts a folders directory with a new folder based on the suggested folder name by a sender of an electronic message in accordance with the method, system, and program of the present invention. Continuing with the e-mail message received in FIG. 5, if a recipient selects to file the e-mail message, the recipient may be offered the option to automatically add a new folder to folders directory 520, where the new folder is titled with the suggested folder name designated by the sender of the e-mail message. In the example, a message window 604 prompts the recipient to select whether to file the e-mail message in a new folder. In the example, if the user selects to file the e-mail message, then the folder is added to folders directory 520, as illustrated at reference numeral 602 and the new folder is highlighted or distinguished in an alternate manner.

In an alternate embodiment, the new folder may be automatically added to the folders directory when the e-mail message is received. If the new folder is automatically added to the folders directory, the new folder is preferably highlighted and the portion of the folders directory within the display window region preferably includes the new highlighted folder.

Figure 7:
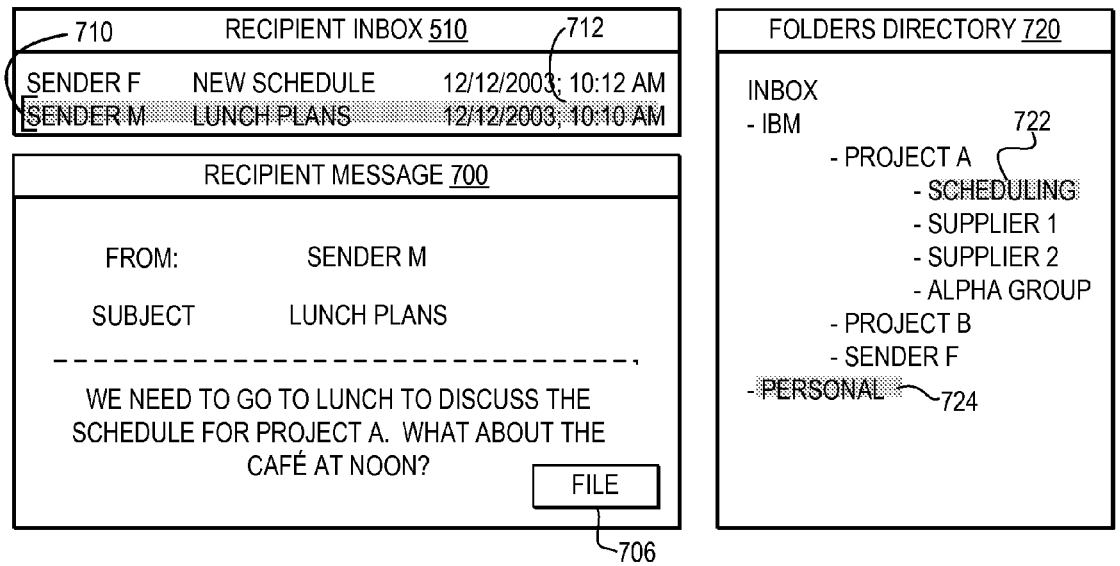
FIG. 7 is an illustrative representation of a recipient messaging interface for drag and drop filing of electronic messages in accordance with the method, system, and program of the present invention.

Referring now to FIG. 7, a block diagram depicts a recipient messaging interface for drag and drop filing of electronic messages in accordance with the method, system, and program of the present invention. As illustrated, the recipient has selected the e-mail message from "sender M" in recipient inbox 510, as depicted by the highlighting at reference numeral 712.

In the example, folders directory window 720 is expanded to display the target and secondary folder suggestions for the e-mail message from "sender M". In particular, the folder titled "scheduling" is highlighted as depicted at reference numeral 722. In addition, the folder titled "personal" is highlighted as depicted at reference numeral 724. One of the highlighted folders may also be designated as the target folder.

According to one embodiment of the invention, the recipient may select file button 706 to initiate filing the e-mail message. Alternatively, however, the recipient may click on the message entry indicated at reference numeral 712 and drag the entry to folders directory 720, as is further depicted in FIG. 8.

Figure 8:
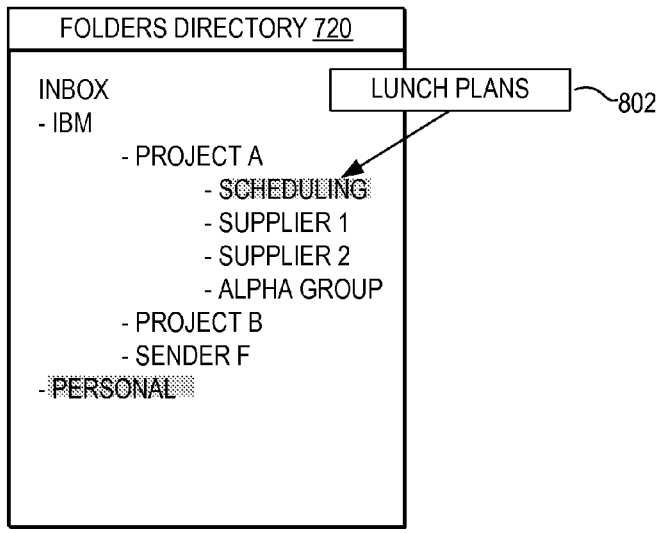
FIG. 8 an illustrative representation of a drag and drop filing system with the suggested folders highlighted in accordance with the method, system, and program of the present invention.

With reference now to FIG. 8, a block diagram depicts a drag and drop filing system with the suggested folders highlighted in accordance with the method, system, and program of the present invention. As illustrated, lunch plans block 802 represents the drag icon that is triggered when the recipient clicks on the message entry indicated at reference numeral 712 in FIG. 7 and begins to drag the message entry. As the recipient drags lunch plans block 802 into folders directory 720, the recipient may manually place block 802 over one of the folders and drop block 802 into that folder to initiate the filing of the e-mail message in that folder. According to an advantage of the present invention, however, once the block 802 is within the window for folders directory 720, the block is automatically positioned over the closest highlighted folder. Alternatively, the suggested folders may be prioritized, such that the block is automatically positioned over the highest priority folder. Further, although not depicted, the recipient may drag block 802 into folders directory 720 and by moving block 820 up and down within folders directory 720, cause the directory displayed within the display region to scroll from one suggested folder to the next.

Figure 9:
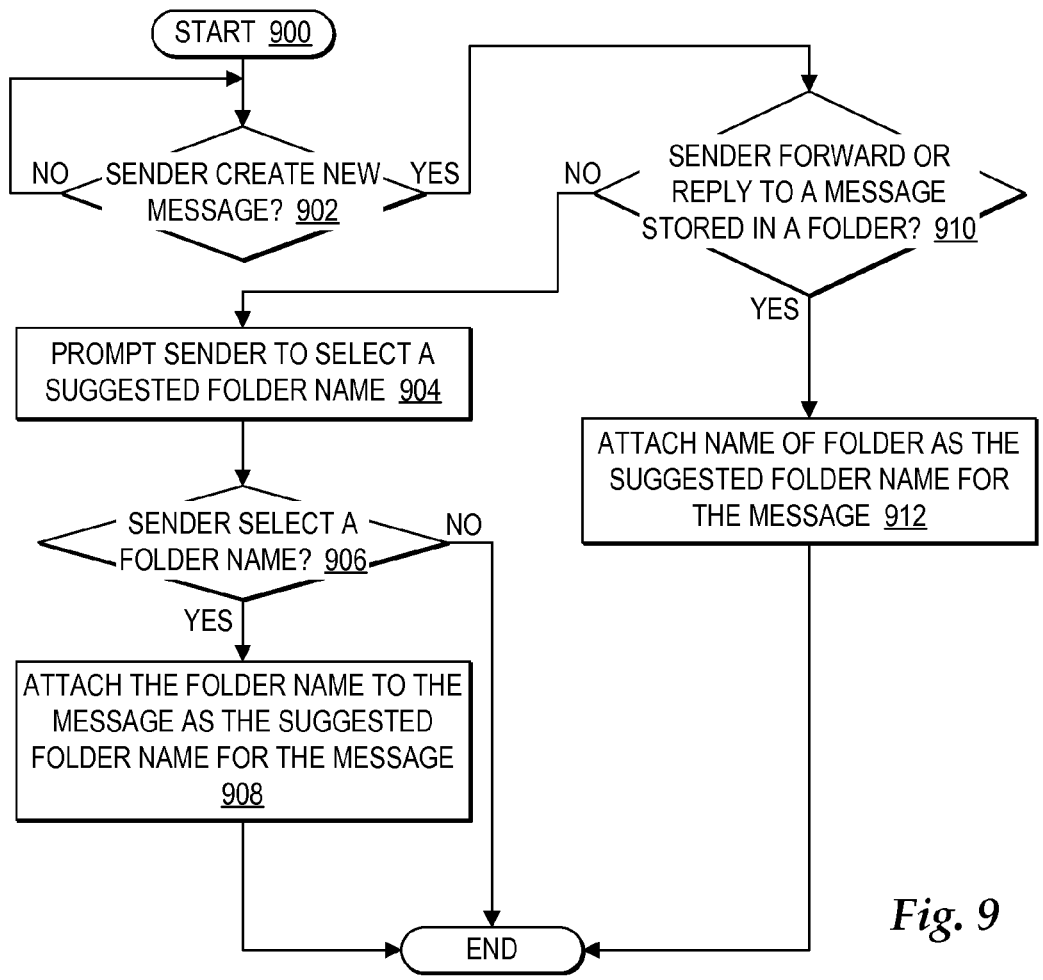
FIG. 9 is a high level logic flowchart depicting a process and program for applying a suggested folder name to an electronic message.

Referring now to FIG. 9, there is depicted a high level logic flowchart of a process and program for applying a suggested folder name to an electronic message. As depicted, the process starts at block 900 and thereafter proceeds to block 902. Block 902 depicts a determination whether a sender has created a new electronic message. If a sender has not created a new electronic message, then the process iterates at block 902. If a sender has created a new electronic message, then the process passes to block 910. Block 910 depicts a determination whether in the new electronic message, the sender is forwarding or replying to a electronic message stored in a folder. If the sender is forwarding or replying to an electronic message stored in a folder, then the process passes to block 912. Block 912 depicts attaching the name of the sender directory folder as the suggested folder name for storing the electronic message, and the process ends. Alternatively, although not depicted, a sender may also be prompted with the option of selecting the suggested folder name from the name of the folder in which the forward or reply to mail is filed in the sender directory folder.

At block 910, if the sender is not forwarding or replying to an electronic message stored in a folder, then the process passes to block 904. Block 904 depicts prompting the sender to select a suggested folder name. In particular, the sender may choose from the folder names of the folders currently in the sender's directory. Alternatively, the electronic message may be scanned for keywords which are provided to the sender to select from as suggested folder names. Next, block 906 depicts a determination whether the sender selects a folder name. If the sender does not select a folder name, then a default suggested folder name or no suggested folder name are included in the electronic message. Alternatively, if the sender does select a folder name, then the process passes to block 908. Block 908 depicts attaching the folder name to the electronic message as the suggested folder name for the electronic message, and the process ends.

Figure 10:
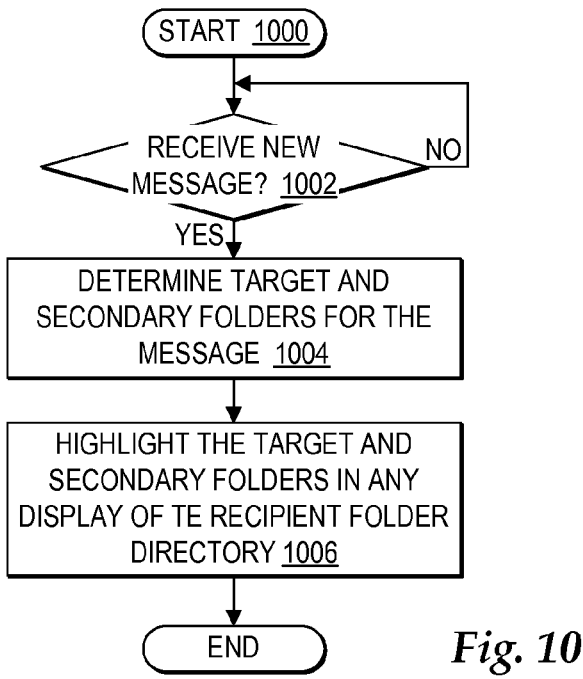
FIG. 10 is a high level logic flowchart depicting a process and program for highlighting suggested folders for filing electronic messages.

With reference now to FIG. 10, there is depicted a high level logic flowchart of a process and program for highlighting suggested folders for filing electronic messages. As depicted, the process starts at block 1000 and thereafter proceeds to block 1002. Block 1002 depicts a determination whether a new electronic message is received. If a new electronic message is not received, then the process iterates at block 1002. If a new electronic message is received, then the process passes to block 1004. Block 1004 depicts determining a target and secondary folders for the electronic message. First, all the suggested folders may be determined. The electronic message may include a suggested folder name designated by the sender. Further, the subject and text of the electronic message may be searched for keywords matching current folder names in the recipient folders directory. The target folder may be a new folder or an existing folder. Next, block 1006 depicts highlighting the target and secondary folders in any display of the recipient folder directory, and the process ends. In particular, the target folder may be highlighted in a manner distinguishable from the secondary folders.

Figure 11:
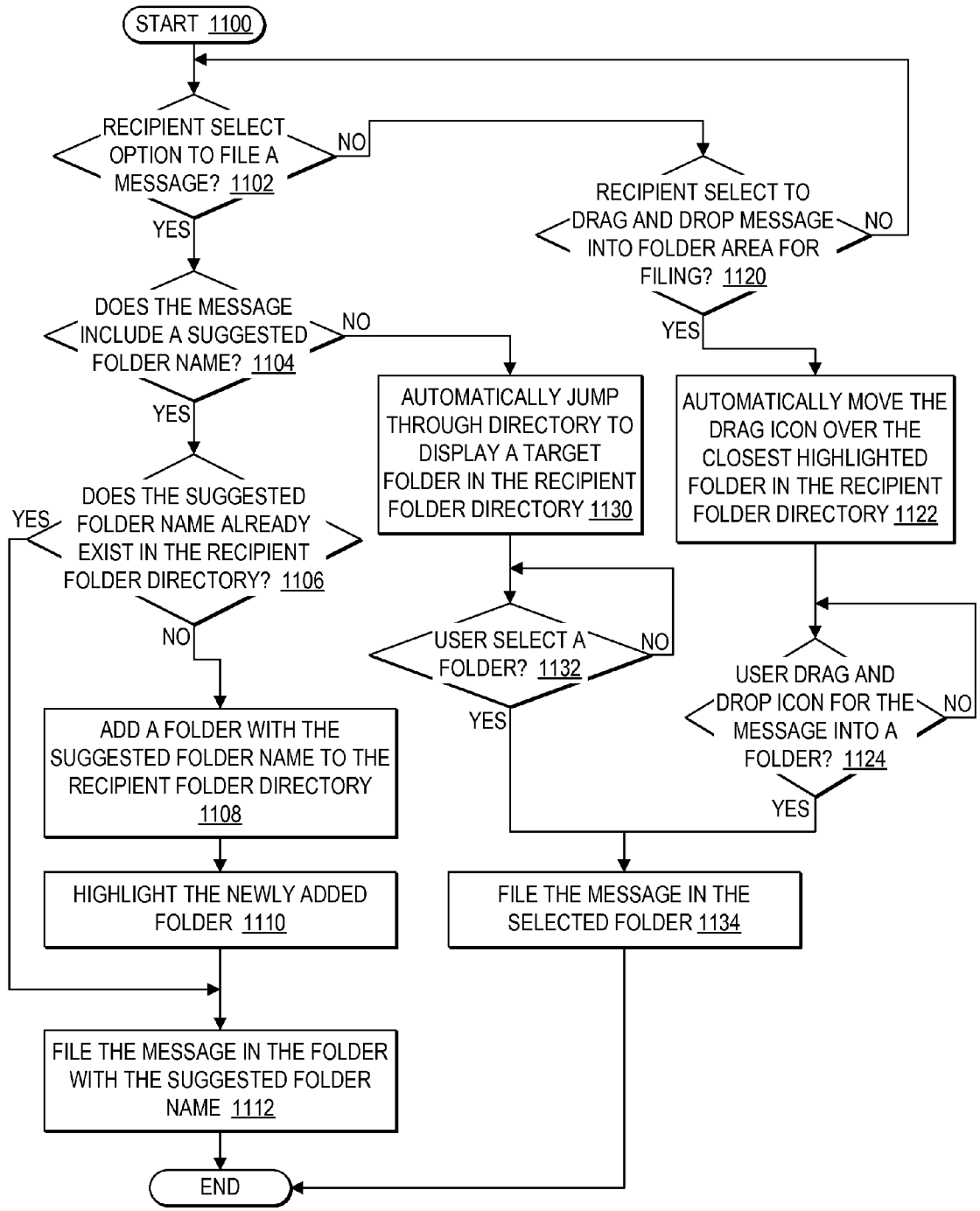
FIG. 11 is a high level logic flowchart depicting a process and program for filtering the filing options for an electronic message.

Referring now to FIG. 11, there is depicted a high level logic flowchart of a process and program for filtering the filing options for an electronic message. As depicted, the process starts at block 1100 and thereafter proceeds to block 1102. Block 1102 depicts a determination whether a recipient of an electronic message has selected an option to file the electronic message. If the recipient of the electronic message selects the option to file the electronic message, then the process passes to block 1104.

Block 1104 depicts a determination whether the electronic message includes a suggested folder name. If the electronic message does include a suggested folder name, then the process passes to block 1106. Block 1106 depicts a determination whether the suggested folder name already exists in the recipient folder directory. If the suggested folder names does not already exist in the recipient folder directory, then the process passes to block 1108. Block 1108 depicts adding a folder with the folder name to the recipient folder directory. Next, block 1110 depicts highlighting the newly added folder. Thereafter, block 1112 depicts filing the electronic message in the folder with the suggested folder name, and the process ends. Returning to block 1106, if the suggested folder name does already exist in the recipient folder directory, then the process passes to block 1112.

At block 1104, if the electronic message does not include a suggested folder name, then the process passes to block 1130. Block 1130 depicts automatically jumping through the recipient folder directory to display a target folder in the recipient folder directory. Additionally, secondary folders may be displayed. Next, block 1132 depicts a determination whether the user selects a folder from the directory. If the user does not select a folder, then the process iterates at block 1132 for a period of time. The user may first create a new folder and then select the new folder. If the user does select a folder, then the process passes to block 1134. Block 1134 depicts filing the electronic message in the selected folder, and the process ends.

Returning to block 1102, if the recipient of the electronic message does not select the option to file the electronic message, then the process passes to block 1120. Block 1120 depicts a determination whether the recipient selects to drag and drop the electronic message into the folder area for filing. If the recipient does not select to drag and drop, then the process returns to block 1102. If the recipient does select to drag and drop, then the process passes to block 1122. Block 1122 depicts automatically moving the drag icon over the closest highlighted folder in the recipient folder directory. Alternatively, the drag icon may be automatically moved over the target highlighted folder in the recipient folder directory. Further, another alternative is that as the user drags the drag icon within the folder directory, suggested folders are highlighted. Next, block 1124 depicts a determination whether the user drops the drag icon for the electronic message into a folder. If the user does not drop the drag icon for the electronic message into a folder, then the process iterates at block 1124 for a period of time. If the user does drop the drag icon for the electronic message into a folder, then the process passes to block 1134 where the electronic message is filed in the selected folder, as previously described, and the process ends.

While the invention has been particularly shown and described with reference to a preferred embodiment, it will be understood by those skilled in the art that various changes in form and detail may be made therein without departing from the spirit and scope of the invention.

What claimed is:

1. A method, the method comprising:
   a computer system receiving an electronic message for a recipient from a sender, wherein said electronic message comprises at least one suggested folder name specified by the sender for the recipient to select as a folder name for filing the electronic message, wherein the at least one suggested folder name is detected by a sender computer system from a selection by the sender within a user interface of the sender computer system of the at least one suggested folder name for the electronic message and inserted into the electronic message;
   the computer system filtering the electronic message to detect the at least one suggested folder name for filing the electronic message in a messaging filing directory;
   the computer system, responsive to detecting an icon for the particular electronic message dragged into a display region for a plurality of folders, automatically positioning the icon over at least one folder with the at least one suggested folder name from among the plurality of folders;
   the computer system, responsive to detecting the icon released over at least one suggested folder from among the at least one folder, detecting the recipient selecting to file the electronic message in the at least one suggested folder; and
   the computer system, responsive to the recipient selecting to file the electronic message, filing the electronic message in the at least one suggested folder with the at least one suggested folder name from among the plurality of folders.

2. The method according to claim 1, further comprising:
   the computer system dynamically graphically distinguishing the at least one folder with the suggested folder name from at least one other folder displayed in an interface displaying the plurality of folders by folder name when the electronic message is filed in the at least one folder.

3. The method according to claim 1, further comprising:
   the computer system automatically adjusting a graphical display of the plurality of folders of the messaging filing directory to display the at least one folder with the suggested folder name from among the plurality of folders.

4. The method according to claim 1, further comprising:
   the computer system, responsive to detecting that the messaging filing directory for the recipient does not comprise at least one folder with a particular folder name matching the at least one suggested folder name, automatically adding a new folder to the messaging filing directory with the suggested filing folder name.

5. The method according to claim 4, further comprising:
   the computer system graphically highlighting the new folder to graphically distinguish the new folder from the other folders from among the plurality of folders.

6. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
   program instructions to receive an electronic message for a recipient from a sender, wherein said electronic message comprises at least one suggested folder name specified by the sender for the recipient to select as a folder name for filing the electronic message, wherein the at least one suggested folder name is detected by a sender computer system from a selection by the sender within a user interface of the sender computer system of the at least one suggested folder name for the electronic message and inserted into the electronic message;
   program instructions to filter the electronic message to detect the at least one suggested folder name for filing the electronic message in a messaging filing directory;
   program instructions, responsive to detecting an icon for the particular electronic message dragged into a display region for a plurality of folders, to automatically position the icon over at least one folder with the at least one suggested folder name from among the plurality of folders;
   program instructions, responsive to detecting the icon released over at least one suggested folder from among the at least one folder, to detect the recipient selecting to file the electronic message in the at least one suggested folder; and
   program instructions, responsive to the recipient selecting to file the electronic message, to file the electronic message in the at least one suggested folder with the at least one suggested folder name from among the plurality of folders.

7. The system according to claim 6, the stored program instructions further comprising:
   program instructions to dynamically graphically distinguish the at least one folder with the suggested folder name from at least one other folder displayed in an interface displaying the plurality of folders by folder name when the electronic message is filed in the at least one folder.

8. The system according to claim 6, the stored program instructions further comprising:

program instructions to automatically adjust a graphical display of the plurality of folders of the messaging filing directory to display the at least one folder with the suggested folder name from among the plurality of folders.

9. The system according to claim 6, the stored program instructions further comprising:

program instructions, responsive to detecting that the messaging filing directory for the recipient does not comprise at least one folder with a particular folder name matching the at least one suggested folder name, to automatically add a new folder to the messaging filing directory with the suggested filing folder name.

10. The system according to claim 9, the stored program instructions further comprising:

program instructions to graphically highlight the new folder to graphically distinguish the new folder from the other folders from among the plurality of folders.

11. A computer program product comprising one or more non-transitory computer-readable storage devices and program instructions, stored on at least one of the one or more storage devices, the stored program instructions comprising:

program instructions to receive an electronic message for a recipient from a sender, wherein the electronic message comprises at least one suggested folder name specified by the sender for the recipient to select as a folder name for filing the electronic message, wherein the at least one suggested folder name is detected by a sender computer system from a selection by the sender within a user interface of the sender computer system of the at least one suggested folder name for the electronic message and inserted into the electronic message;

program instructions to filter the electronic message to detect the at least one suggested folder name for filing the electronic message in a messaging filing directory;

program instructions, responsive to detecting an icon for the particular electronic message dragged into a display region for a plurality of folders, to automatically position the icon over at least one folder with the at least one suggested folder name from among the plurality of folders;

program instructions, responsive to detecting the icon released over at least one suggested folder from among the at least one folder, to detect the recipient selecting to file the electronic message in the at least one suggested folder; and program instructions, responsive to the recipient selecting to file the electronic message, to file the electronic message in the at least one suggested folder with the at least one suggested folder name from among the plurality of folders.

12. The computer program product according to claim 11, the stored program instructions further comprising:

program instructions to dynamically graphically distinguish the at least one folder with the suggested folder name from at least one other folder displayed in an interface displaying the plurality of folders by folder name when the electronic message is filed in the at least one folder.

13. The computer program product according to claim 11, the stored program instructions further comprising:

program instructions to automatically adjust a graphical display of the plurality of folders of the messaging filing directory to display the at least one folder with the suggested folder name from among the plurality of folders.

14. The computer program product according to claim 9, the stored program instructions further comprising:

program instructions, responsive to detecting that the messaging filing directory for the recipient does not comprise at least one folder with a particular folder name matching the at least one suggested folder name, to automatically add a new folder to the messaging filing directory with the suggested filing folder name.

15. The computer program product according to claim 14, the stored program instructions further comprising:

program instructions to graphically highlight the new folder to graphically distinguish the new folder from the other folders from among the plurality of folders.

* * * * *